United States Patent [19]

Okura et al.

[11] Patent Number: 5,140,682
[45] Date of Patent: Aug. 18, 1992

[54] STORAGE CONTROL APPARATUS

[75] Inventors: Hiroyuki Okura, Hadano; Jiro Imamura, Hiratsuka; Norio Yamamoto, Isehara; Masaya Watanabe, Hadano, all of Japan

[73] Assignees: Hitachi, Ltd, Tokyo; Hitachi Microcomputer Engineering, Ltd., Kodaira, both of Japan

[21] Appl. No.: 376,870

[22] Filed: Jul. 7, 1989

[30] Foreign Application Priority Data

Jul. 8, 1988 [JP] Japan ............... 63-169090

[51] Int. Cl.⁵ .......................... G06F 12/00
[52] U.S. Cl. ............... 395/425; 364/DIG. 2; 364/931.46; 364/937.01; 364/965.4; 364/957.6
[58] Field of Search ............... 364/200, 900; 395/425

[56] References Cited

U.S. PATENT DOCUMENTS

| | | | |
|---|---|---|---|
| 4,214,304 | 7/1980 | Shimizu et al. | 364/200 |
| 4,392,200 | 7/1983 | Arulpragasam et al. | 364/200 |
| 4,639,862 | 1/1987 | Wada et al. | 364/200 |
| 4,843,543 | 6/1989 | Isobe | 364/200 |
| 4,916,604 | 4/1990 | Yamamoto et al. | 364/200 |

*Primary Examiner*—Thomas M. Heckler
*Attorney, Agent, or Firm*—Antonelli, Terry, Stout & Kraus

[57] ABSTRACT

A storage control apparatus contains plural request stacks for storing the access request; a stack selecting circuit for selecting a request stack by accepting the access requests one after another and for storing the access request; and a priority determining circuit for selecting the access request stored in said request stack in order of priority and makes access to a main storage unit in response to an access request from an input-output processor, instruction processor and the like. When memory access requests are issued continuously from the unit as a source of issuing the same access request to the storage control apparatus, the access request which follows can make access to a cache memory while the previous request is making access to the main storage unit, thereby preventing a reduction in a total throughput.

12 Claims, 3 Drawing Sheets

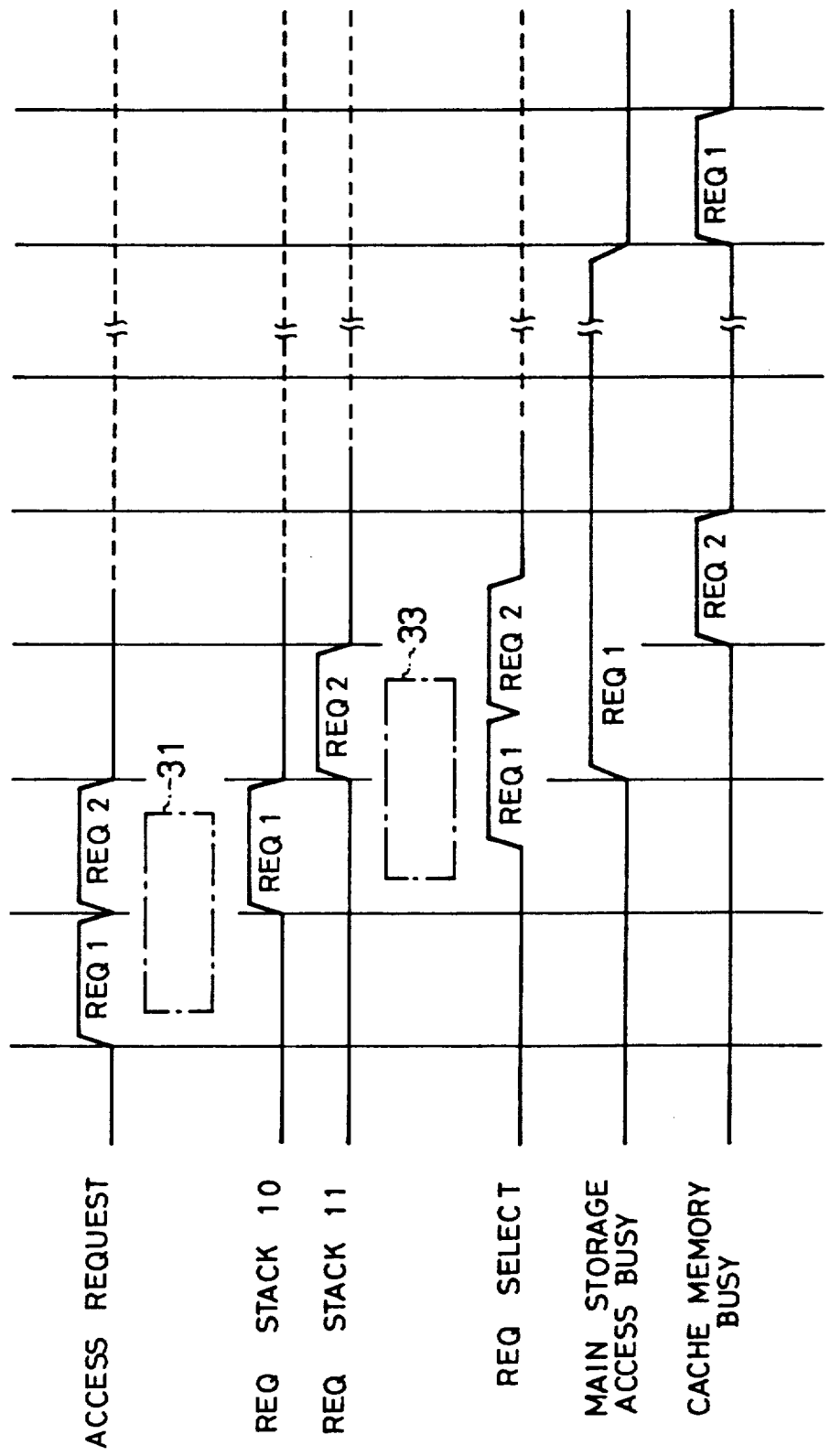

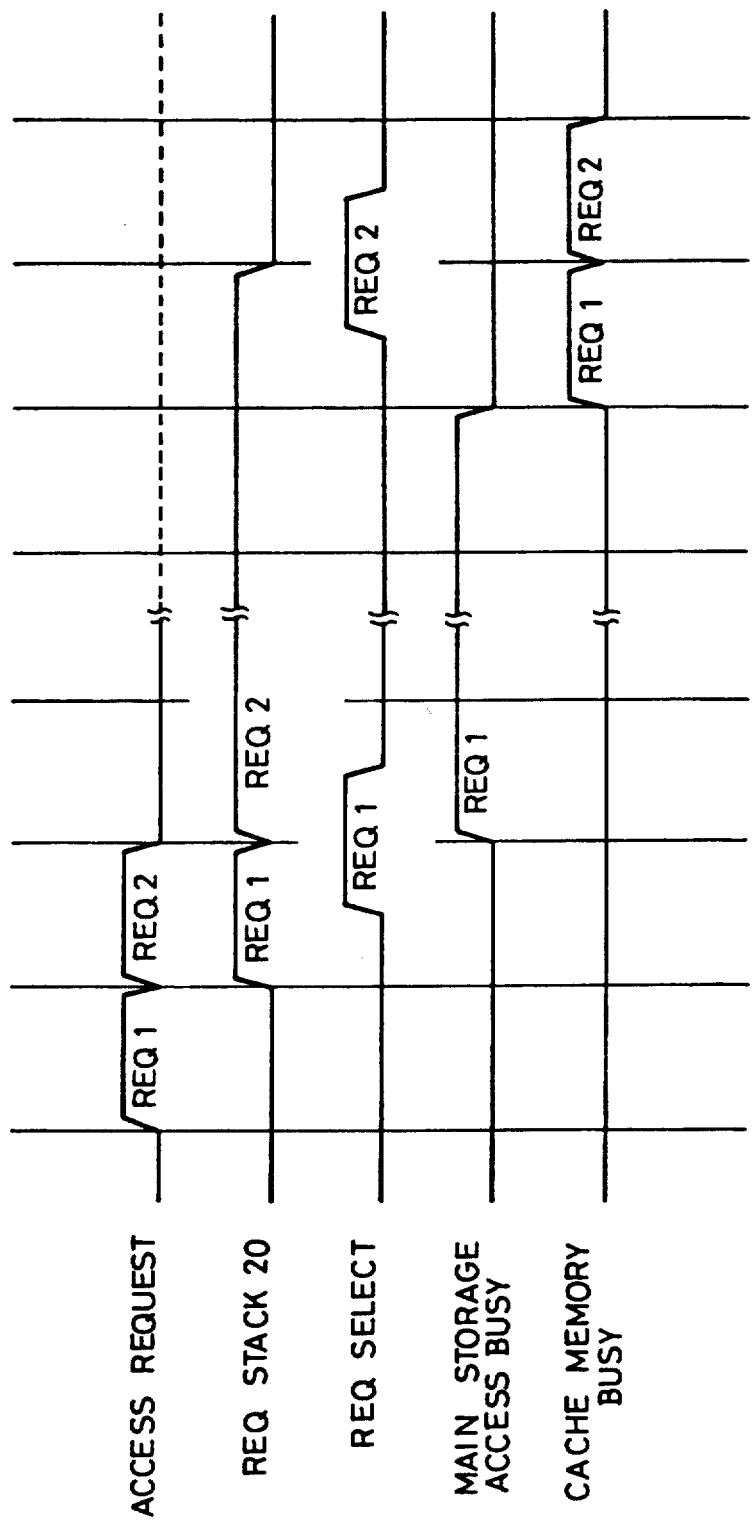

STORAGE CONTROL APPARATUS

BACKGROUND OF THE INVENTION

The present invention relates to a storage control apparatus and, more particularly, to a storage control apparatus adapted to access a main storage unit in response to access requests from input-output processor, an instruction processor and the like.

In a multiple processing system adapted to share a main storage unit with various processors by making plural input-output processors and plural instruction processors, access to the main storage unit through a storage control apparatus in which a cache memory is provided. Access control over the main storage unit can be carried out by processing a memory access request from each of the input-output processors and the instruction processors.

Heretofore, the access control over the main storage unit of this kind is known to be of the type of a buffer storage control as disclosed, for example, in Japanese Patent Publication (laid-open) No. 154,039/1987. The buffer storage control type is a storage control type in which the buffer storage (cache memory) is shared with plural central processing units, and the buffer storage is read or written in a store-in system. In this type, there disposed a register holding a block address which is memory replaces in buffer storage for the access requests from the plural central processing units, and an access to the block address held in the register is prohibited until a memory block transfer containing a desired data for an access request to the buffer storage from the main storage and an address registration of an address array is finished. As this does not affect processing for invalidating the address array corresponding to the replace block if the memory data required does not exist in the buffer storage, the address array can be retrieved without awaiting a memory access which follows. Thus improving a throughput of the address array, that is, a throughput of the buffer storage.

It is, however, to be noted that, in the buffer storage control type, when the memory data required is not stored in the buffer storage, the buffer storage can be made accessible without the following access request from a device as a source of issuing a different access request being waited, thus improving a throughput of the memory access.

However, nothing is taken into consideration about the case that a memory access request which follows is issued from the same device as in the previous memory access request. Accordingly, if the following memory access request is issued from the same device as the previous memory access request, the following memory access request remains waiting. In other words, if plural requests are issued one after another from the same device, the following request is awaited during a period of time when the previous request awaits a data transfer from the main storage; although it can access a cache memory. For this reason, when plural requests are issued one after another from the same device, the following request is awaited for a longer time, thus reducing a total throughput.

SUMMARY OF THE INVENTION

Therefore, the present invention has the object to provide a storage control apparatus adapted to make access to a main storage unit in response to an access request from an input-output processor, an instruction processor and the like, thus executing an access control so as to receive the access request without the following request being awaited.

Another object of the present invention is to provide a storage control apparatus capable of executing an access control so as to make access to a cache memory without the following request being awaited while the previous request is made accessible to the main storage unit without making access to the cache memory.

In order to achieve the objects, the present invention is characterized by a storage control apparatus adapted to access a main storage unit in response to an access request from an input-output processor or an instruction processor, comprising plural request stacks for storing the access request; a stack selecting circuit for selecting a request stack by accepting the access requests one after another and for storing the access request; and a priority determining circuit for selecting the access request stored in said request stack in order of priority.

In a system in which such a storage control apparatus is provided and plural input-output processors or instruction processors share the main storage unit through the storage control apparatus, an access request issued from the input-output processors; instruction processors or the like is accepted by a stack selecting circuit which, in turn, selects a request stack and stores the access request in the request stack. The request stored in the request stack is then selected in accordance with an order of priority of processing request requests by a priority determining circuit and this, leads to a memory access.

Furthermore, if the storage control apparatus is provided with a cache memory for storing a portion of storage data of the main storage unit, the priority determining circuit selects requests stored in the request stack in accordance with an order of priority of processing access requests and provides the cache memory with the request, thus making a memory access.

As the storage control apparatus operates in the manner as have been described hereinabove, it is seen that if one input-output processor or instruction processor is provided with plural request receptions or accepting portions, when the storage control apparatus is shown from the unit serving as a unit issuing an access request, like plural input-output processors or instruction processors are. As the request issued from the unit as the source of issuing the access request is set in each of plural request receptions (plural request stacks), the priority determining circuit of the storage control apparatus selects an access request and executes an access storage control of a memory in substantially the same manner in which a request from a different input-output processor or instruction processor is processed. For this reason, even if the previous request is still in the process of accessing the main storage unit, the following request enables an access to a cache memory, thus shortening a waiting time for the following request and consequently preventing a decrease in a total throughput.

As a memory access control by the storage control apparatus processes an access request of the following request which passes ahead of the previous request, this control is executed when no order guarantee for an order of processing the previous and following requests is necessary as in the case of a request from the input-output processor. When an order guarantee for an order of processing of the previous and following requests is needed as in the case of a request from the instruction processor, a stack selecting circuit executes a control so as to set an acceptance of the request in the same request stack.

BRIEF DESCRIPTION OF THE DRAWINGS

Other objects, features and advantages of the present invention will become apparent in the course of the description of the preferred embodiments which follow in the light of the accompanying drawings, in which:

FIGS. 2 and 3 are each a time chart explaining an operation of the storage control apparatus of FIG. 1.

DETAILED DESCRIPTION OF THE PREFERRED EMBODIMENTS

Figure 1:
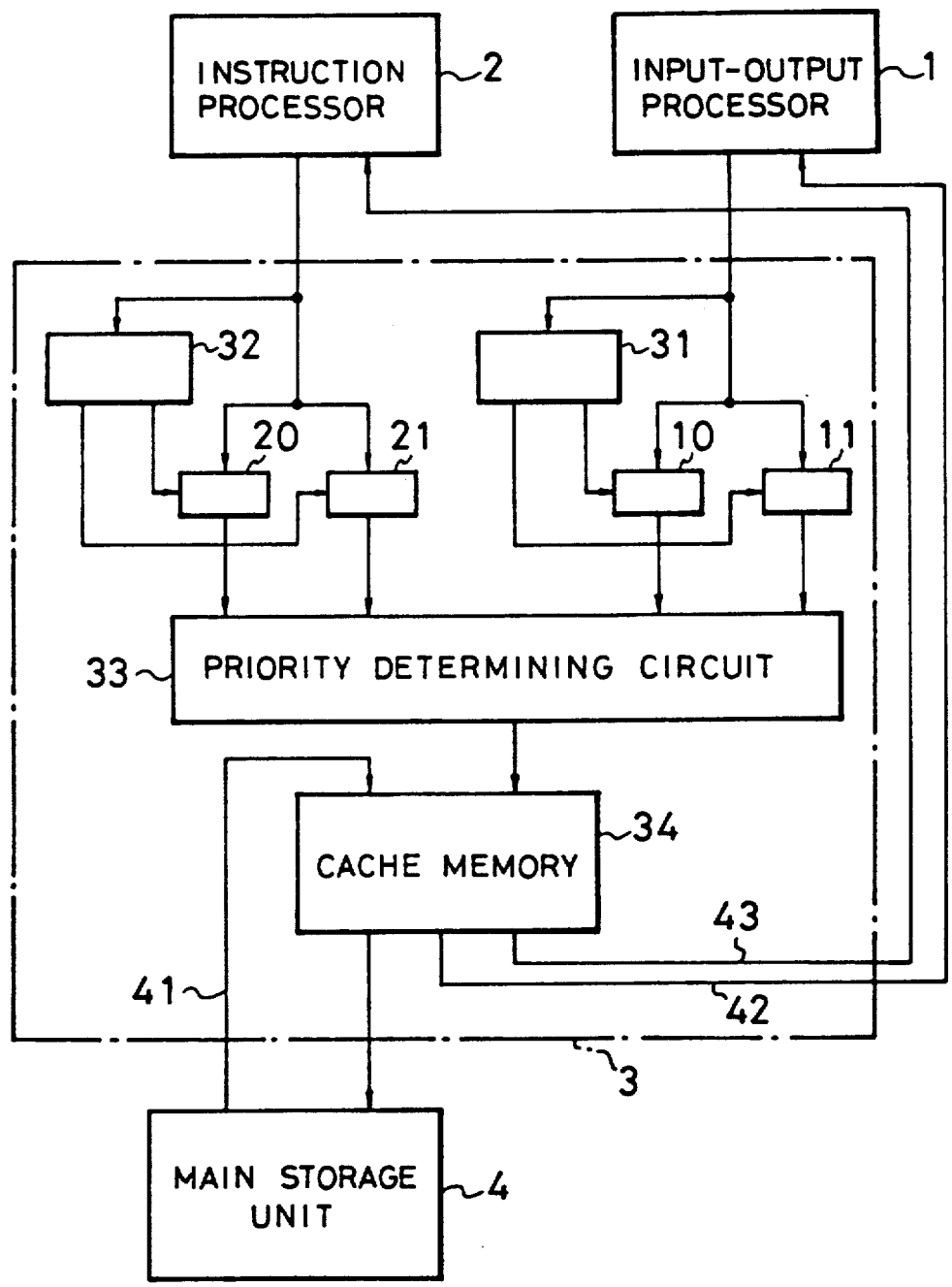
FIG. 1 is a block diagram showing a construction of the essential portion of a data processing system containing a storage control apparatus according to one example of the present invention.

FIG. 1 is a block diagram showing the essential portion of the construction of the data processing system containing the storage control apparatus according to one example of the present invention. As shown in FIG. 1, reference numeral 1 stands for an input-output processor, 2 for an instruction processor; 3 stands for a storage control unit; 4 stands for a main storage unit; 10 and 11 stands for request stacks for storing a memory access request from the input-output processor 1; 20 and 21 stands for request stacks for storing a memory access request from the instruction processor 2; 31 stands for a stack selecting circuit on the side of the input-output processor, which accepts the access request and selects the request stacks 20 and 21 storing the access request; 33 stands for a priority determining circuit; and 34 stands for a cache memory in which the storage control unit is equipped. Each of the request stacks is constituted by a FIFO (first-in first-out) register.

FIGS. 2 and 3 are each a time chart showing operation of the storage control apparatus of FIG. 1.

The operation of the storage control apparatus will be described with reference to FIG. 2. The data processing system is a system in which the input-output processor 1 and the instruction processor 2 share the main storage unit 4 housing the cache memory 34 through the storage control unit 3. As request REQ1 for a memory request from the input-output processor 1 enters the stack selecting circuit 31, the circuit 31 accepts request REQ1, selects either of the request stack 10 or 11, and sets request REQ1 which is by the corresponding request stack 10. In this embodiment, the request stack 10 is selected and request REQ1 accepted by the request stack 10 is set. Thereafter, as request REQ2 is issued from the input-output processor 1, the following request REQ2 is added to the stack selecting circuit 31. As the stack selecting circuit 31 accepts the following request REQ2, it selects the request stack 11 which is different from the request stack 10, that has accepted the previous request, and sets the request REQ2 accepted by the selected request stack 11. During this period, the previous request REQ1 is added to the priority determining circuit 33 which, in turn, determines an access priority between the added request REQ1 and the request simultaneously added and selects the request of the highest priority, providing the cache memory 34 with the memory access request.

The cache memory 34 executes the memory access by request REQ1 of the memory access request given from the priority determining circuit 33. When the cache memory 33 has not store a memory data as an object for access, the cache memory 34 issues a request for a data transfer to the main storage unit 4 and awaits the data transfer of the memory data from the main storage unit 4 while holding a source of the access request as a main storage access busy. At this time, the request REQ1 stored in the request stack 10 is stayed in a waiting state. In this case, as the memory data which is read from the main storage unit 4 is stored in the cache memory 34 through a path 41, request REQ1 can for the first time have access to the cache memory 34, thus enabling an execution of an access to request REQ1. The memory data as the object for access stored in the cache memory 34 is fed from the cache memory 34 to the input-output processor 4 through a path 42. If the access request is a read request, a transfer of data from the path 41 of the main storage unit 4 may be particularly loaded directly on the path 42 to the input-output processor 1.

It is, however, to be noted that, at this time, an access time to which a time for awaiting a data transfer of request REQ1 from the main storage unit 4 is added is longer than an access to the cache memory 34 so that the cache memory 34 produces a spare time which is accessible to the following request. Therefore, when the following request REQ2 is given to the cache memory 34 by the priority determining circuit 33 during this time, the cache memory 34 permits an execution of access to request REQ2. In other words, if data accessible by the following request REQ2 is present in the cache memory 34, the access execution of request REQ2 stored in the request stack 11 is carried out by overtaking the access execution of request REQ1 and terminates prior to request REQ1 stored in the request stack 10.

Such an access control to be executed by the storage control unit 3 is made to a memory access request such as a request issued from the input-output processor 1 and is applied to the processing which does not require an order guarantee for an order of processing requests. Operation in this case is conducted in the same manner as the previous operation. In other words, the stack selecting circuit 32 and request stacks 20 and 21 on the side of the instruction processor 2 are operated each in the same manner as the stack selecting circuit 31 and the request stacks 10 and 11 on the side of the input-output processor 1, thus executing an access to the request without causing the following request to be awaited.

FIG. 3 is a time chart for describing operation of the storage control unit when an order guarantee for processing the requests in order is required, and operation will be described with reference to FIG. 3.

The requests requiring an order guarantee to be issued from the instruction processor 2 to the main storage unit 3 will be processed in the following manner. Request REQ1 of a memory access request issued by the instruction processor 2 is accepted by the stack selecting circuit 32 and either of the request stork 20 or 21 is selected under a control by the stack selecting circuit 32 to set the request. For example, request REQ1 is set at the request stack 20. Thereafter, if the following request REQ2 is issued by the instruction processor 2 which requires an order guarantee, it is also set at the request stack 20 in which the stack selecting circuit 32 has previously accepted and set. Each of the request stacks is constituted by a first-in first-out (FIFO) register, and the previous request REQ1 which has already been set in the request stack 20 is selected by the priority determining circuit 33 and given to the cache memory 34 during this time, thus executing a memory access. If data required for access by the request REQ1 does not exist in the cache memory 34, the cache memory 34 issues a request for data transfer to the main storage unit 4, whereby the request REQ1 enters into a waiting state. During this time, the following request REQ2 is stored in the request stack 20 and it is neither retrieved from the request stack 20 nor fed to the priority determining circuit 33 until the execution of the previous request REQ1 is ended. Thus, the priority determining circuit 33 does not select request REQ2. The data of the previous request REQ1 read from the main storage unit 4 is stored in the cache memory 34 through the path 41, thus enabling execution of an access request. At this time, as request REQ1 is made accessible to the cache memory 34, the data read is fed to the instruction processor 2 through the cache memory 34. As the priority determining circuit 33 feeds an access request of the previous request REQ1 to the cache memory 34 which, in turn, accepts the request REQ1 to proceed with the access execution. Then the priority determining circuit 33 selects the following request REQ2 set in the request stack 20 and feeds the access request for the following request REQ2 to the cache memory 34. At this time, although the following request REQ2 is awaited in accordance with the content of the previous request REQ1, this permits processing the requests requiring an order guarantee for the order of processing between the requests.

The data processing system as have been described for the embodiment of the present invention is composed of a system in which one input-output processor and one instruction processor are connected to the storage control unit. It is noted, however, that, in a data processing system, generally two or more input-output processors and two or more instruction processors can be connected. Furthermore, the access control of the main storage can be executed by substantially the same storage control if a plurality of processors or control units for issuing an access request, other than the input-output processor and instruction processor are connected. The number of the plural request stacks in the storage control unit, which serve as acceptance portion for the unit as a source of issuing the access request, can be increased; more as required.

The present invention has been described by way of example, but it is to be understood that the present invention should not be restricted to the above examples and construed to contain various modifications without departing from the scope of the invention.

The present invention presents the advantages that, when memory access requests are continuously issued to the storage control unit from the unit as a source of issuing the same access requests, a request which follows can make access to the cache memory even while the previous request is making access to the main storage unit, thus preventing an increase in a total throughput.

What is claimed is:

1. A control method for executing an access request in a storage control apparatus to access a main storage unit in response to a plurality of access requests from a processor, comprising a cache memory for storing a portion of storage data of the main storage unit; plural request stacks for storing the plurality of access requests; a stack selecting circuit for selecting a request stack of said plural request stacks for accepting the plurality of access requests one after another and for storing the plurality of access requests in said plural request stacks; and a priority determining circuit for selecting a first and a second access request stored in said plural request stacks in an order of priority and transmitting the first and the second access request selected by priority determining circuit to the cache memory, comprising:
   a first step of accepting the plurality of access requests from the processor by sorting the plurality of access requests into a first plurality of first access requests requiring no order guarantee and providing no assurance of an order of processing and a second plurality of second access requests requiring an order guarantee;
   a second step of sequentially storing the first plurality of first access requests in each of said plural request stacks and storing the second plurality of second access requests in a first request stack of said plural request stacks;
   a third step of reading simultaneously the plurality of access requests stored in said plural request stacks, determining the order of priority for processing the access requests, and providing said cache memory with the access requests in accordance with the order of priority; and
   a fourth step of providing said cache memory with the first access request having an order of priority which is the next highest priority when the second access request having an order of priority which is a highest priority is accessing the main storage unit.

2. A storage control apparatus to access a main storage unit in response to a plurality of access requests from a processor, comprising:
   a stack selecting circuit for sequentially receiving access requests from said processor;
   a plurality of request stacks connected to said stack selecting circuit and said processor for receiving said plurality of access requests from said stack selecting circuit, said stack selecting circuit selecting a request stack of said plurality of request stacks for storing an access request in said request stack in accordance with whether the access request requires an order guarantee;
   a priority determining circuit for selecting the access requests stored in said request stacks in an order of priority,
   wherein said stack selecting circuit operates to determine if an access request requires an order guarantee corresponding to an order of processing.

3. A storage control apparatus as in claim 2, wherein said stack selecting circuit further operates in response to a first access request to store said first access request in a first request stack of said plurality of request stacks and in response to a second access request to store said second access request in said first request stack following said first access request when said second access request requires an order guarantee.

4. A storage control apparatus as in claim 3, further comprising:
   a cache memory for storing a portion of storage data of the main storage unit, said priority determining circuit transmitting said first access request to said cache memory,
   wherein said priority determining circuit further operates to prevent said second access request from being selected when memory data of said first access request is not stored in said cache memory until a data transfer of said first access request is complete.

5. A storage control apparatus as in claim 4, wherein said priority determining circuit further operate to transmit said second access request to said cache memory when said data transfer is complete.

6. A storage control apparatus as in claim 2, wherein said stack selecting circuit further operates in response to a first access request to store said first access request in a first request stack of said plurality of request stacks and in response to a third access request requiring no order guarantee to store said third access request in another request stack than said first request stack of said plurality of request stacks.

7. A storage control apparatus as in claim 6, wherein said second means in said stack selecting circuit sequentially selects said plurality of request stacks.

8. A storage control apparatus as in claim 6, further comprising:
a cache memory for storing a portion of storage data of the main storage unit, said priority determining circuit transmitting said first access request to said cache memory,
wherein said priority determining circuit further operates to transmit said third access request to said cache memory when memory data of said first access request is not in said cache memory.

9. A storage control apparatus as claimed in claim 2, wherein each of said plurality of request stacks is a first-in first-out register.

10. A storage control apparatus as claimed in claim 2, wherein said plurality of request stacks and said stack selecting circuit correspond with an input-output processor.

11. A storage control apparatus as claimed in claim 2, wherein said plurality request stacks and said stack selecting circuit correspond with an input-output processor and an instruction processor.

12. A storage control apparatus to access a main storage unit in response to a plurality of access requests from a processor comprising:
a stack selecting circuit for sequentially receiving said plurality of access requests from said processor;
a plurality of request stacks connected to said stack selecting circuit and said processor for receiving said plurality of access requests from said stack selecting circuit, said stack selecting circuit selecting a request stack of said plurality of request stacks and storing an access request in said request stack in accordance with whether the access request requires an order guarantee;
a cache memory for storing a portion of storage data of the main storage unit;
a priority determining circuit for selecting access requests stored in said request stack in an order of priority and transmitting said access request to said cache memory,
wherein said processor operates to store said plurality of access requests.

* * * * *